L. J. BAKER,
Assignor to J. O. WETHERBEE.
Picture-Rod Molding.
No. 8,208. Reissued April 30, 1878.
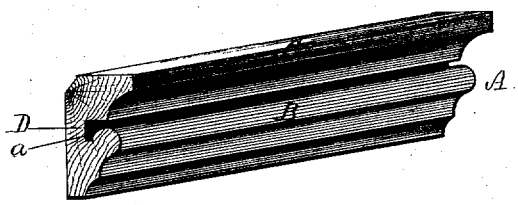
*Witnesses.*
*Wm. Tirrell Andrews Jr.*
*Louis A. Curtis.*
*Inventor.*
*Loring J. Baker.*
*F. Curtis. Atty.*
N. PETERS, PHOTO-LITHOGRAPHER, WASHINGTON, D. C.

UNITED STATES PATENT OFFICE.

LORING J. BAKER, OF BOSTON, MASS., ASSIGNOR TO J. OTIS WETHERBEE.

IMPROVEMENT IN PICTURE-ROD MOLDINGS.

Specification forming part of Letters Patent No. 194,952, dated September 11, 1877; Reissue No. 8,208, dated April 30, 1878; application filed April 17, 1878.

*To all whom it may concern:*

Be it known that I, LORING J. BAKER, of Boston, in the county of Suffolk and State of Massachusetts, have invented certain new and useful Improvements in Picture-Rod Moldings, of which the following is a specification:

This invention is based upon what is known in the trade as a "picture-rod molding"—that is to say, a strip of wood in the form of a molding, which is secured to the wall of an apartment immediately below and parallel to the ceiling, and provided with a prominent bead, from which the picture-hook is suspended, and from which the molding mainly derives its name.

My invention consists, first, in adding to a picture-rod molding proper, and to the upper part of the same, a second portion, which I term a "cornice"; and, secondly, in the employment of a channel, which is disposed intermediately between the body of the molding and the cornice, and serves to receive the nails which secure the molding to the wall, while the swell of the molding below the channel serves to conceal the heads of the nails.

The drawing accompanying this specification represents a perspective view of a piece of picture-rod molding containing my improvements.

In carrying my improvements into practice, I construct a molding with a lower main portion, A, which corresponds with the picture-rod moldings in common use, and contains a bead, B, from which are hung the hooks that suspend pictures upon the wall of the apartment, and I add to the upper part of this molding A a portion, C, which I term a "cornice," and which serves to fill the corner between the wall and ceiling of the said apartment, and imparts a finished appearance to the latter.

Between the parts A and C, I create a channel or depression, D, through the back or bottom *a* of which I drive the nails which secure the entire molding to the wall.

The bead B, below the channel D, in addition to supporting the hooks, serves also to obscure the heads of the nails which are driven through such channel, and all evidences of mutilation of the molding are concealed.

Moldings have long been in common use which contain a lip at the rear of the upper part, through which nails may be driven to secure the molding to a wall, the swell below the said lip serving to conceal or obscure the heads of the nails.

A molding of this character is open to various objections. In the first place, an unsightly space is perceptible between the front of the molding and the ceiling, while, secondly, the weight of a picture is supported only by a thin and narrow strip of wood, which, in many instances, is inadequate for the purpose, and the wood is split and the molding detached from the wall.

One important object I have had in view in the employment of the cornice C, in addition to fitting closely up to the ceiling, is to provide a considerable body of wood above the nails which confine the molding to the wall, in order to provide sufficient material to support the weight of the picture.

By my construction the same nails secure both the cornice and the molding proper, entering, as they do, the channel D, in which the heads are received and concealed from view.

The combined molding and cornice can be expeditiously and easily applied to the wall, and its cost is much less than that of a molding and cornice in independent strips.

I claim—

1. A picture-rod molding consisting of the molding portion A, formed with a picture-hook-receiving bead, B, and the cornice C above the bead, substantially as and for purposes stated.

2. A picture-rod molding containing upon its front face a channel for reception of nails when the bottom of such channel is obscured by the portions of the molding below it, substantially as and for purposes stated.

3. A picture-rod molding consisting of a molding proper, a cornice disposed above such molding, and an intermediate nail-receiving channel, substantially as and for purposes stated.

LORING J. BAKER.

Witnesses:
M. BAILEY,
M. GEORGII.